(12) United States Patent
Trank et al.

(10) Patent No.: US 8,418,512 B2
(45) Date of Patent: Apr. 16, 2013

(54) UNIVERSAL ADJUSTABLE SECURITY LOCK FOR TRUCK TAILGATES AND OTHER CLAMPING APPLICATIONS

(75) Inventors: Andrew D. Trank, Orchard Park, NY (US); John F. Mondo, Hamburg, NY (US); David C. Meyer, Boston, NY (US); Wayne A. Hemmerling, Orchard Park, NY (US)

(73) Assignee: McGard LLC, Orchard Park, NY (US)

( * ) Notice: Subject to any disclaimer, the term of this patent is extended or adjusted under 35 U.S.C. 154(b) by 0 days.

(21) Appl. No.: 13/192,949

(22) Filed: Jul. 28, 2011

(65) Prior Publication Data

US 2012/0024023 A1 Feb. 2, 2012

Related U.S. Application Data

(60) Provisional application No. 61/369,134, filed on Jul. 30, 2010.

(51) Int. Cl.
  *E05B 73/00* (2006.01)
(52) U.S. Cl.
  USPC .............................. 70/18; 70/16; 70/19; 70/58
(58) Field of Classification Search ................ 24/274 R, 24/296, 274 P, 279; 285/420, 419, 367; 70/16, 70/18, 19, 58
  See application file for complete search history.

(56) References Cited

U.S. PATENT DOCUMENTS

| 2,944,314 | A | * | 7/1960 | Black | 24/279 |
| 4,059,872 | A | * | 11/1977 | Delesandri | 24/279 |
| 4,558,891 | A | * | 12/1985 | Wagner et al. | 285/322 |
| 5,630,255 | A | * | 5/1997 | Eliasson | 24/274 R |
| 5,666,831 | A | * | 9/1997 | Doros | 70/232 |
| 5,729,873 | A | * | 3/1998 | Miley | 24/274 R |
| 6,305,054 | B1 | * | 10/2001 | Imes et al. | 24/279 |
| 7,302,741 | B2 | * | 12/2007 | Bowater | 24/279 |
| 7,328,704 | B2 | * | 2/2008 | Voorhees | 70/16 |
| 7,389,568 | B2 | * | 6/2008 | Crockett et al. | 24/274 R |
| 2004/0098843 | A1 | * | 5/2004 | Chen | 24/274 P |
| 2009/0083950 | A1 | * | 4/2009 | Corogin | 24/274 R |
| 2009/0173115 | A1 | * | 7/2009 | Meyer et al. | 70/164 |

OTHER PUBLICATIONS

McGard, LLC, "Pickup Truck Tailgate Locks", Aug. 1, 1995, 1 page.
Pace-Edwards Company, "2010 Catalog", Jan. 1, 2010, 10 pages.
Pickup Specialties.com, "Tailgate Pad Lock", downloaded from <http://www.pickupspecialties.com/Tailgate_stuff/tailgate_locks_by_bully.htm> on Jul. 14, 2011, 4 pages.

* cited by examiner

*Primary Examiner* — Christopher Boswell
*Assistant Examiner* — David E Sosnowski
(74) *Attorney, Agent, or Firm* — Walter W. Duft

(57) ABSTRACT

A security lock for clamping a structure may include a lock housing having a barrel portion that mounts an adjustable band-type clamp. The clamp is adjustable using a lock screw that is rotatable in the housing and has threads that adjustably engage a ridged thread pattern on the clamp. The lock screw has a head that is recessed in a guideway of the housing. The lock screw head has a security lock pattern that requires a matching security key to rotate the lock screw.

20 Claims, 3 Drawing Sheets

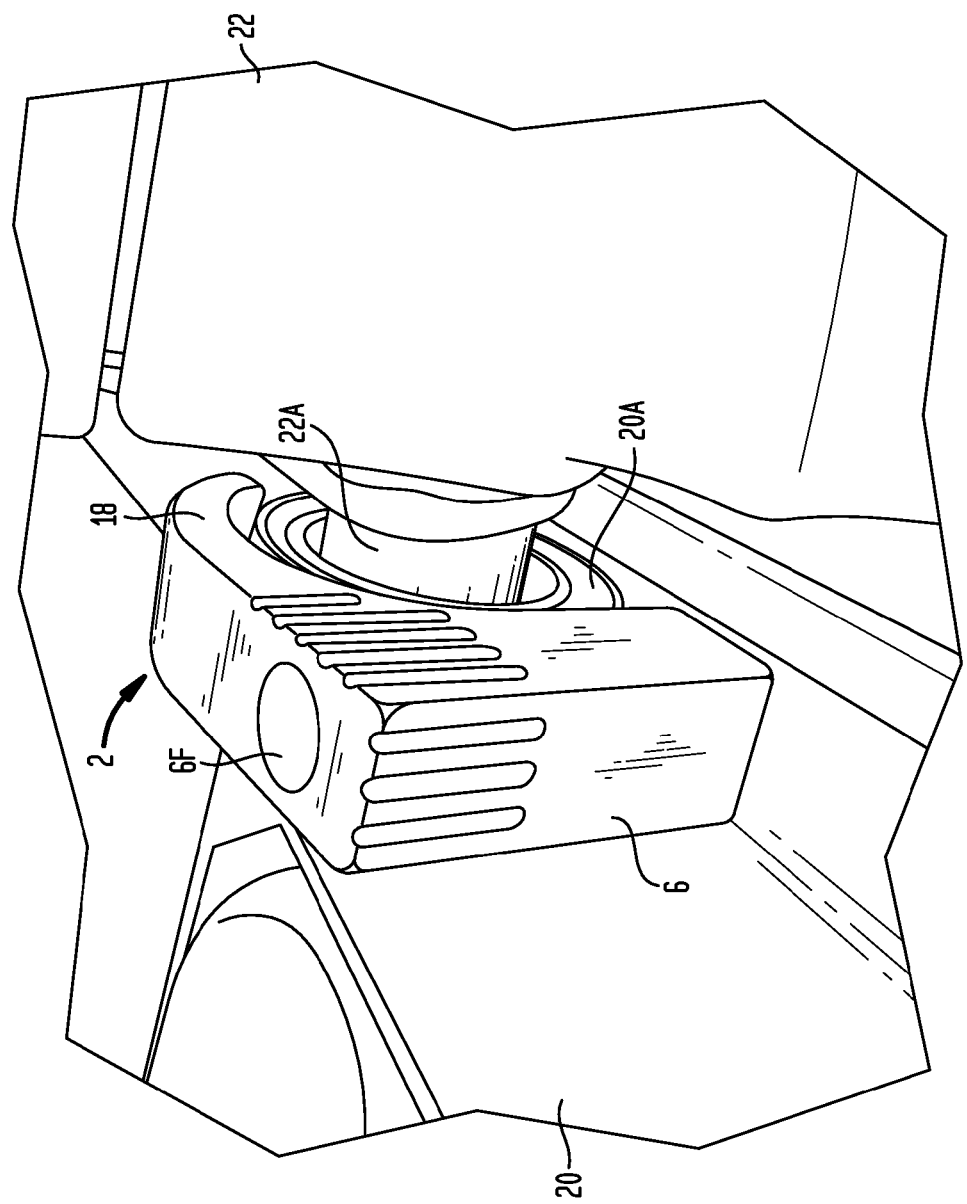

UNIVERSAL ADJUSTABLE SECURITY LOCK FOR TRUCK TAILGATES AND OTHER CLAMPING APPLICATIONS

CROSS-REFERENCE TO RELATED APPLICATIONS

This application claims priority to and the benefit under 35 U.S.C. 119(e) of U.S. Provisional Application No. 61/369,134, filed on Jul. 30, 2010. The entire contents of said Provisional Application No. 61/369,134 are hereby incorporated by this reference as if fully set forth herein.

BACKGROUND

1. Field

The present disclosure relates to clamping-type security locks for installation on removable tailgates of trucks and other vehicles, or for other clamping applications.

2. Description of the Prior Art

By way of background, various types of clamping-type security locks have been used to secure removable tailgates on trucks and other vehicles. Such locks commonly include a band or other clamping element that clamps over a structure to be secured (such as a tailgate hinge cup). The clamping element is attached to a locking mechanism that can be opened in order to release the clamping element during lock installation, and which can thereafter be closed to capture the clamping element so that it cannot be removed from the structure on which the lock is installed. Unfortunately, such locks may lack adequate adjustability, so that they cannot be properly tightened in place. This may result in rattling or other unwanted lock movement that may damage the finish on the vehicle or other structure on which the lock is installed. Such locks may also have security features that are relatively easy to breach using commonly available tools (such as lock picks, pry-bars or hacksaws). Accordingly, it is to improvements in clamping-type security locks that the present disclosure is directed.

SUMMARY

According to an example embodiment, a security lock for clamping a structure may include a lock housing having a barrel portion that mounts an adjustable band-type clamp. The clamp is adjustable using a lock screw that is rotatable in the housing and has threads that adjustably engage a ridged thread pattern on the clamp. The lock screw has a head that is recessed in a guideway of the housing. The lock screw head has a security lock pattern that requires a matching security key to rotate the lock screw.

In the example embodiment, the guideway may be cylindrical in shape and the lock screw head may be circular and sized to fit within the guideway with minimal clearance for added security. A housing insert may be provided to help retain the lock screw in the housing. A lock liner may be provided on the housing that extends along an inside surface of the clamp for a selected distance. The lock liner may begin at or near a base of the clamp where clamp mounts to the housing, and may extend toward a free end of the clamp. A portion of the lock liner may define a channel that slidably captures the clamp. When the security lock is installed on a structure to be locked, the lock liner may be disposed between the clamp and the structure. The lock liner may be provided with graduated markings and associated sizing numerals to assist in trimming the lock liner when the security lock is mounted on a small structure. The housing may include a curved arm extending from the barrel portion of the housing. The arm may have a channel that receives a base portion of the clamp and helps stabilize it.

BRIEF DESCRIPTION OF THE DRAWINGS

The foregoing and other features and advantages will be apparent from the following more particular description of the example embodiment, as illustrated in the accompanying Drawings, in which:

FIG. 4 is a perspective view showing the security lock of FIG. 1 following installation on a vehicle tailgate;

DETAILED DESCRIPTION OF EXAMPLE EMBODIMENT

Figure 1:
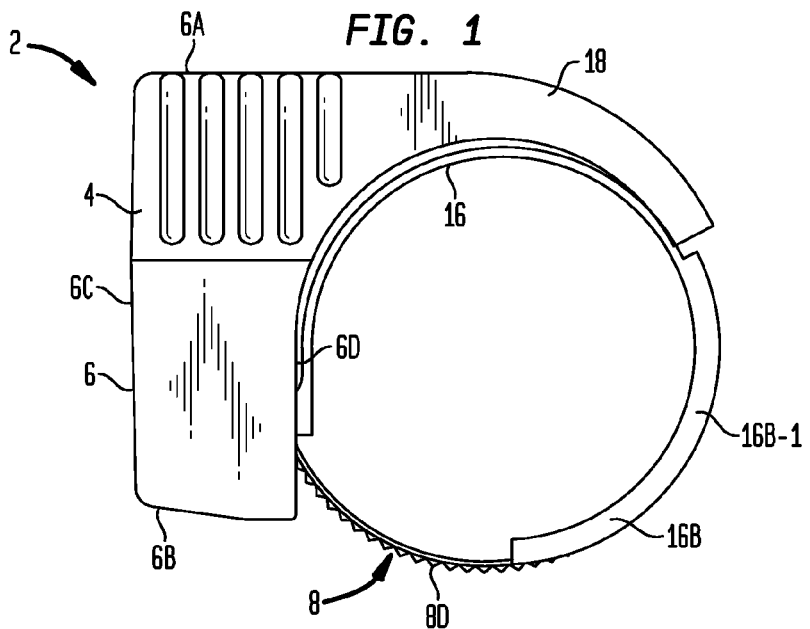
FIG. 1 is a side elevation view showing a security lock that has been constructed in accordance with an example embodiment.
Figure 2:
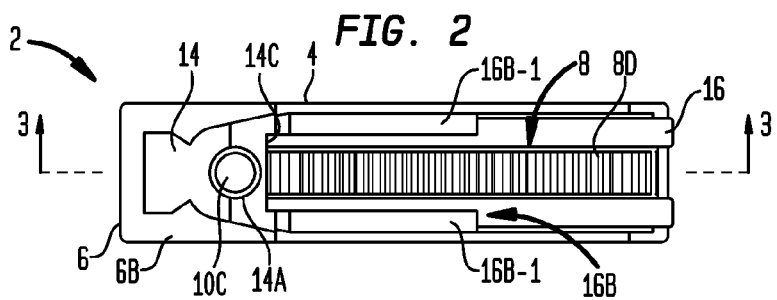
FIG. 2 is a bottom view showing the security lock of FIG. 1.
Figure 3:
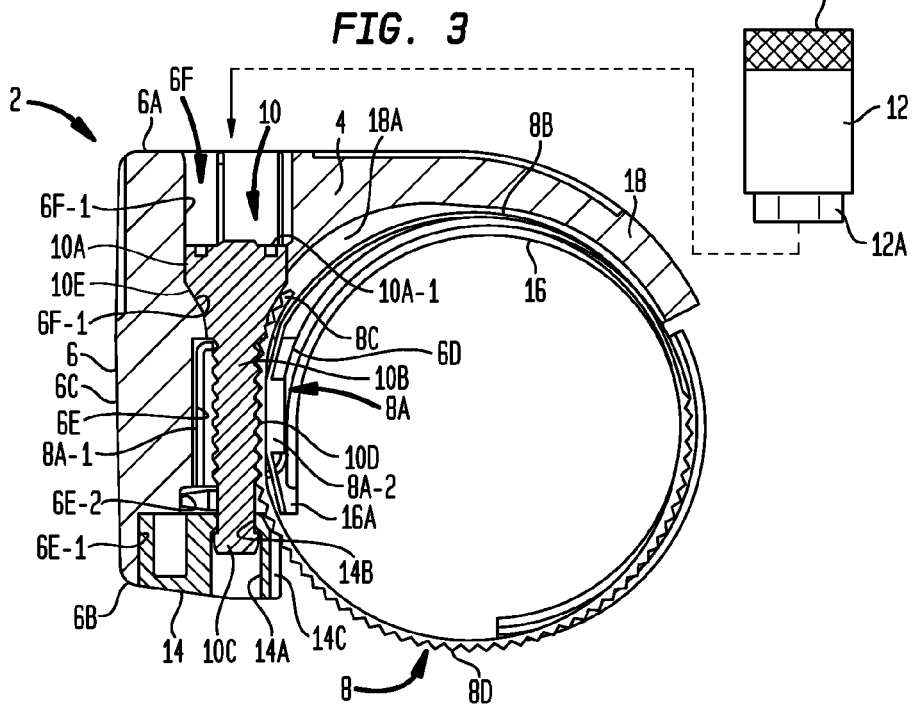
FIG. 3 is a cross-sectional view taken along line 3-3 in FIG. 2.

Turning now to FIGS. 1-3, a security lock 2 constructed in accordance with an example embodiment is shown. In the illustrated embodiment, the security lock 2 includes a lock housing 4 having a barrel portion 6 that mounts an adjustable band-type clamp 8. The housing barrel 6 includes a first end 6A, a second end 6B, a first side 6C and a second side 6D. As can be seen in FIG. 3, a channel 6E may be formed in the housing barrel 6 in order provide a cavity for mounting a base 8A of the clamp 8. The channel 6E opens to both the second end 6B and the second side 6D of the barrel 6. In the illustrated embodiment, the channel 6E is generally U-shaped along a major portion of its length. As shown in FIGS. 2 and 3, the channel 6E may also include an enlarged key-shaped portion 6E-1 formed at the housing's second end 6B. The purpose of the key-shaped channel portion 6E-1 is described in more detail below. A bore 6F is also formed in the housing barrel 6. The bore 6F begins at the barrel's first end 6A (the bore entrance) and continues parallel to the first and second sides 6C and 6D of the barrel 6 until it intersects the channel 6E.

The clamp 8 is of conventional band-clamp design. Its base 8A includes a first side 8A-1 having a generally U-shaped configuration that seats in the generally U-shaped portion of the channel 6E. A second side 8A-2 of the clamp base 8A mounts a flexible clamp band 8B. The clamp band 8B starts at the second side 8A-2 of the base 8A and is configured to wrap around a structure to be locked. By virtue of the open cavity provided by the channel 6E, a free end 8C of the clamp band 8B is insertable into the lock housing 4 at a point where the base 8A of the clamp is mounted therein. This allows the clamp band free end 8C to be placed in overlapping relationship with the clamp base 8A, namely, on the inside of the second side 8A-2 thereof (as shown in FIG. 3).

The clamp 8 is adjustable using a lock screw 10 that is rotatable in the bore 6F of the housing barrel. The lock screw 10 has a head 10A, a shank 10B having an enlarged retainer flange 10C at the free end thereof, a set of threads 10D on the shank 10B, and a tapered seat 10E. When the free end 8C of the clamp band 8B is inserted into the small gap between the shank 10B of the lock screw 10 and the second side 8A-2 of the clamp base, the threads 10D will adjustably engage a ridged thread pattern 8D on the clamp band 8B that extends from the clamp band free end 8C. Rotation of the lock screw 10 in a clockwise direction pulls the free end 8C of the clamp band 8B into the housing 4 and increases its overlap with the clamp base 8A, thereby tightening the security lock 2 on the structure to be secured. Conversely, rotating the lock screw 10 in a counterclockwise direction pushes the free end 8C of the clamp band 8B in the opposite direction and decreases its overlap of the clamp base end 8A, thereby loosening the security lock 2. Advantageous, the adjustment of the clamp band 8B due to clockwise or counterclockwise rotation of the lock screw 10 is a continuous rather than incremental adjustment. This allows the security lock 2 to be clamped onto any structure whose size allows it to be wrapped by the clamp band 8B, thereby ensuring a tight fit without rattling or other unwanted lock movement.

The head 10A of the lock screw 10 has a circular sidewall and is recessed within the entrance of the bore 6F. This portion of the bore 6F is shaped to define a conforming cylindrical guideway 6F-1 that receives the lock screw 10. The guideway 6F-1 is sized so that there is minimal clearance between the screw head 10A and the sidewall of the guideway. This makes it difficult for an unauthorized tool to be wedged against the side of the screw head 10A. The exposed face of the screw head 10A is generally planar and configured with a security lock pattern that may be formed as a continuous curvilinear groove 10A (or other formation) in the generally planar surface. A security key 12 with a matching curvilinear ridge pattern 12A (or other formation) may be used to engage the security lock pattern 10A-1 to rotate the lock screw 10. This arrangement is designed to prevent unauthorized removal of the security lock 2. Other key-lock interface configurations could also be used. The security key 12 may have a cylindrical body that is sized to closely fit within the guideway 6F-1 to help position the security key into engagement with the security lock pattern 10A-1. A drive-receiving opening 12B (e.g., a square drive opening) may be formed at the end of the security body that is opposite from the curvilinear ridge pattern. The drive-receiving opening 12B is appropriately shaped to receive a ratchet, a screw driver, or other drive tool.

A housing insert 14 at the second end 6B of the housing barrel 6 may be used to help position and retain the lock screw in the lock housing 4. As can be seen in FIG. 2, the insert 14 is generally key-shaped to match the configuration of the key-shaped portion 6E-1 of the channel 6E of the housing barrel 6. When installed in the channel's key-shaped portion 6E-1, the insert 14 forms part of the barrel's second end 6B. The insert 14 includes a circular bore 14A that receives the retainer flange 10C at the end of the screw shank 10B. The base of the bore 14A is formed with an annular flange 14B of reduced diameter that is sized to engage the side of the screw shank 10B and trap the retainer flange 10C within the bore. A small channel 14C may also be formed in the insert 14 to allow passage of the free end 8C of the clamp band 8B into the lock housing 4 for insertion between the lock screw 10 and the second side 8A-2 of clamp base 8A. As shown in FIG. 2, the matching configuration of the insert 14 and the key-shaped channel portion 6E-1 prevents the insert from displacing out of the barrel channel 6E in the direction of the barrel's second side 6D. The engagement of the retainer screw's flange 10C within the bore 14A prevents the insert 14 from displacing out of the barrel channel 6E in the direction of the barrel's second end 6B.

It will be seen in FIG. 3 that the lock screw 10 is securely positioned and retained within the housing barrel 6. In particular, the lock screw 10 is prevented from moving in the direction of the barrel's second end 6B by virtue of its tapered seat 10E engaging a correspond tapered portion 6F-1 of the bore 6F. The lock screw 10 is prevented from moving in the direction of the barrel's first end 6A by virtue of the retainer flange 10C being trapped by the flange 14B within the bore 14A of the insert 14. With the lock screw 10 thus retained in the housing barrel 6, it will also be seen in FIG. 3 that the lock screw will, in turn, fixedly mount the clamp 8 to the lock housing 4 due to the lock screw extending between the two sides 8A-1 and 8A-2 of the base 8A of the clamp.

A flexible lock liner 16 may be provided on the lock housing 4. The lock liner 16 extends along the inside of the clamp band 8B for a selected distance. The lock liner 16 may begin at or near the clamp base 8A and extend toward the clamp band's free end 8C. In the illustrated embodiment, the lock liner 16 has a base 16A that encircles the shank 10B of the lock screw 10 (see FIG. 3). The lock liner base 16A is seated in a stepped area 6E-2 of the housing barrel channel 6E that is adjacent to the channel's key-shaped portion 6E-1. The key-shaped insert 14 retains the lock liner base 16A in the stepped area 6E-2 to secure the lock liner 16 to the lock housing 4. A free end portion of the lock liner may be formed to define a channel 16B having flanges 16B-1 that slidably capture the sides of the clamp band 8B. When the security lock 2 is installed on a structure to be locked, the lock liner 16 will be disposed between the clamp band 8B and the structure. As shown in FIG. 5D (described in more detail below), the lock liner 16 may have graduated markings 16C with associated sizing numerals 16D that assist in trimming the lock liner to a desired length for installation of the security lock 2 on small structures.

The lock housing 4 may be provided with a curved rigid arm 18 that extends from the barrel 6 of the lock housing and follows a portion of the clamp band 8B. The rigid arm 18 may have a channel 18A (see FIG. 3) that receives the clamp band 8B and helps stabilize it against lateral movement. The rigid arm 18 may extend for a desired distance to cover a desired portion of the clamp band 8B, such as the portion that would be otherwise exposed following installation of the security lock 2. In this way, the rigid arm may help protect the clamp band 8B against tampering using an unauthorized tool, such as a pry bar or a hacksaw.

The security lock 2 can be made from various materials that provide the desired level of security. For example, the lock housing 4 could be made from rigid plastic or metal, the clamp 8 and the lock screw 10 can be made from metal, and the lock liner 16 can be made from flexible plastic so it can be easily manipulated, and also trimmed.

The security lock 2 may be installed on removable tailgates of various makes and models of trucks or other vehicles. The security lock 2 may also be used for general clamping applications. FIG. 4 illustrates an installation of the security lock 2 on the tailgate 20 of a vehicle 22. In this installation, the security lock 2 is secured so that the clamp band 8B will wrap tightly around a hinge cup 20A on the tailgate 20. The hinge cup 20A is rotatably mounted on a tailgate hinge 22A extending from one side the vehicle 22 (i.e., the left rear side of the truck bed). As pickup truck and SUV owners will appreciate, the hinge cup 20A is designed to be removed from the hinge 22A so that the tailgate 20 can be removed. Although not shown, a slot that is at least as wide as the outside diameter of the hinge 22A is typically provided in the hinge cup 20A for this purpose. The security lock 2 prevents tailgate removal by virtue of the clamp band 8B covering this slot, such that the hinge cup 20A can no longer be removed from the hinge 22A unless the security lock is removed.

Figure 5A:
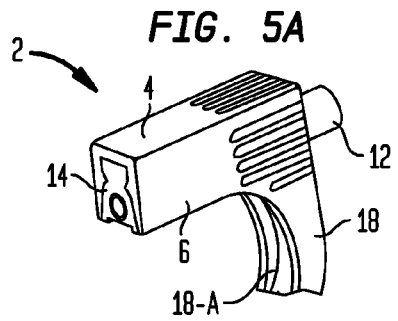
FIG. 5A is a perspective view showing the security lock of FIG. 1 during a first stage of installation on a vehicle tailgate.
Figure 5B:
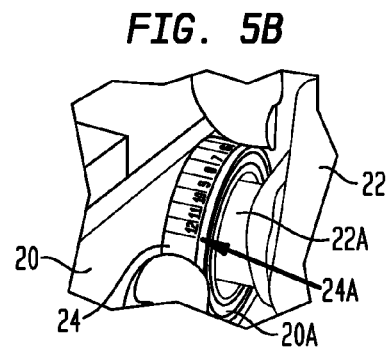
FIG. 5B is a perspective view showing the tailgate security lock of FIG. 1 during a second stage of installation on a vehicle tailgate.
Figure 5C:
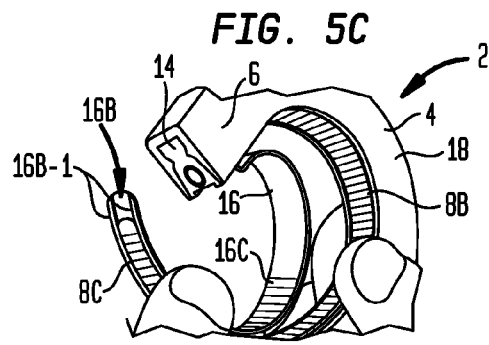
FIG. 5C is a perspective view showing the tailgate security lock of FIG. 1 during a third stage of installation on a vehicle tailgate.
Figure 5D:
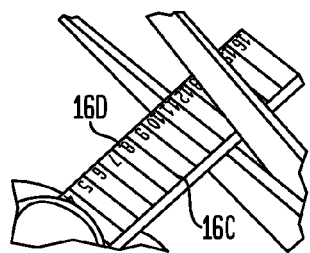
FIG. 5D is a perspective view showing the tailgate security lock of FIG. 1 during a fourth stage of installation on a vehicle tailgate.

Turning now to FIGS. 5A-5H, an example installation sequence is shown that may be used to install the security lock 2 on a vehicle tailgate as shown in FIG. 4. In FIG. 5A, the security key 12 is inserted into the guideway 6F-1 of the bore 6F in the housing barrel 6. The security key 12 is manipulated so that its key pattern 12A engages the lock pattern 10A-1 formed at the head 10A of the lock screw 10. The security key 12 is then turned counterclockwise until the free end 8C of the clamp band 8B is separated from the clamp base 8A and freed from the lock housing 4.

In FIG. 5B, the circumference of the tailgate hinge cup 20A is measured to verify if the lock liner 16 needs to be trimmed prior to security lock installation. A measuring tape 24 may be used for this purpose. The measuring tape 24 could be a conventional measuring tape used for sewing or the like. Alternatively, a measuring strip (not shown) could be printed on an instruction sheet that accompanies the security lock 2. This measuring strip could be cut with scissors from the instruction sheet and then used to provide the measuring tape 24. To perform the measurement, the tailgate 20 is opened to expose the tailgate hinge cup 20A. The measuring tape 24 is then wrapped tightly around the hinge cup 20A and the hinge cup circumference indicated by the measuring tape is noted. In FIG. 5B, the hinge cup circumference measurement is indicated by the arrow 24A. If the ends of the measuring tape 20A do not overlap, no trimming of the lock liner 16 should be needed.

If the lock liner 16 needs to be trimmed, the operations shown in FIGS. 5C and 5D may be performed. In FIG. 5C, the lock liner 16 is slid along the clamp band 8B until the channel 16B of the lock liner slides off the free end 8C of the clamp band and the flanges 16B-1 of the channel 16B are disengaged from the sides of the clamp band. In FIG. 5F, the lock liner 16 is trimmed with scissors or a utility knife using the graduated markings 16C and the sizing numeral 16D that corresponds to the tailgate hinge cup circumference measurement obtained in FIG. 5D. The lock liner 16 may then be reinstalled on the clamp band 8B by inserting the free end 8C thereof into the lock liner channel 16B and sliding the lock liner along the clamp band until the lock liner lies generally against the clamp band.

Figure 5E:
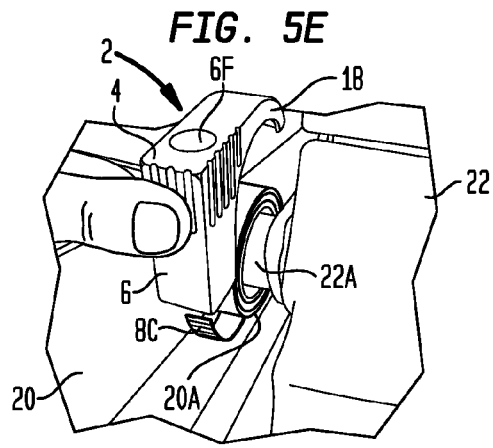
FIG. 5E is a perspective view showing the tailgate security lock of FIG. 1 during a fifth stage of installation on a vehicle tailgate.
Figure 5F:
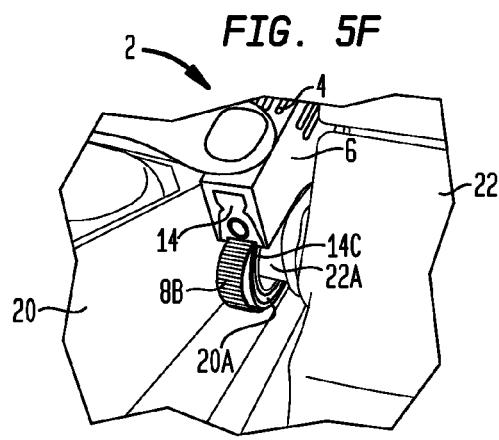
FIG. 5F is a perspective view showing the tailgate security lock of FIG. 1 during a sixth stage of installation on a vehicle tailgate.

In FIG. 5E, the lock housing 4 is positioned in the manner shown, with the clamp band 8B looped behind the hinge cup 20A and with the free end 8C thereof ready to enter the lock housing 4. In FIG. 5F, the free end 8C of the clamp band 8B is inserted into the lock housing 4 via the channel 14C of the insert 4 (see FIG. 3). As shown, this may be done while tilting the lock housing 4 so that the lock housing bore 6F is angled forwardly. The clamp band free end 8C may then be advanced until it enters the small gap between the shank 10B of the lock screw 10 and the second side 8A-2 of the clamp base (see FIG. 3), and so that the threads 10D of the lock screw 10 adjustably engage the clamp band's ridged thread pattern 8D. While holding the clamp band 8B, the security key 12 may be rotated several turns in the clockwise direction to start the engagement.

Figure 5G:
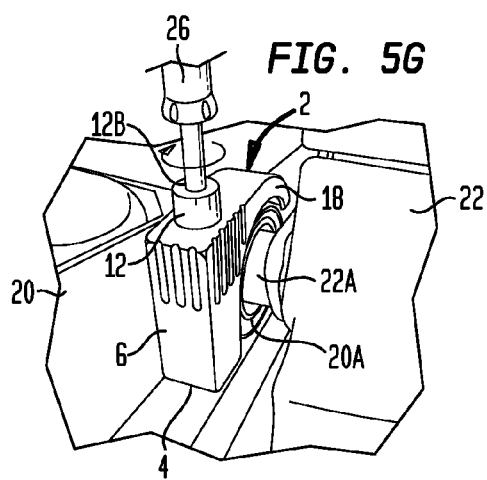
FIG. 5G is a perspective view showing the tailgate security lock of FIG. 1 during a seventh stage of installation on a vehicle tailgate.
Figure 5H:
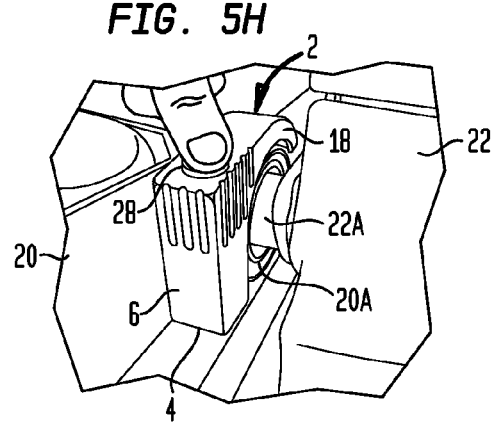
FIG. 5H is a perspective view showing the tailgate security lock of FIG. 1 during a eighth stage of installation on a vehicle tailgate.

In FIG. 5G, the lock housing 4 is tiled back so that the lock housing bore 6F is facing upwardly and the second end 6B of the housing barrel 6 rests on the tailgate 20. Using a suitable drive tool 26 (e.g., a square drive attached to a screw driver handle or a ratchet), the security lock 12 is turned clockwise to continue advancement of the clamp band 8B until the security lock 2 is tightened snugly on the hinge cup 20A. In FIG. 5H, the security key 12 is removed and a plastic insert 28 may be inserted into the lock housing bore 6F to keep out dirt.

Accordingly, a security lock 2 for clamping a structure has been disclosed. Advantageously, the size and fit of the security lock 2 can be continuously adjusted with the use of a movable clamp 8 comprising a clamp band 8B that is selectively tightened using an adjustable lock screw 10. This provides a tight fit on a variety of vehicles/tailgates/other structures while preventing the security lock 2 from rattling or damaging the finish on the vehicle or other structure. The security lock housing 4 also provides added protection against unauthorized removal due to the rigid arm 18 thereof. Although an example embodiment has been shown and described, it should be apparent that many variations and alternative embodiments could be implemented in accordance with the present disclosure. For example, although a clamp band 8B and an adjustable lock screw 10 are shown in the illustrated embodiment, other clamp positioners comprising any suitable component, structure, device or system capable of adjusting the clamp and maintaining it in a desired position could be used. It is understood, therefore, that the invention is not to be in any way limited except in accordance with the spirit of the appended claims and their equivalents.

What is claimed is:

1. A security lock for clamping a structure, comprising:
a lock housing;
said housing having a barrel portion that mounts a base of an adjustable band-type clamp;
said clamp base having a first side comprising a generally U-shaped configuration that seats in a generally U-shaped channel portion of said barrel portion and a second side that mounts a base end of a flexible clamp band;
said clamp being adjustable using a lock screw having a lock screw head that is rotatably seated in said housing and a lock screw shank that extends through said clamp base between said first and second sides thereof, said lock screw shank having threads that adjustably engage a ridged thread pattern extending from a free end of said clamp band when said clamp band free end is positioned in said clamp base between said lock screw shank and said second side of said clamp base;
said lock screw head being recessed in a guideway of said housing; and
said lock screw head having a security lock pattern that requires a matching security key to rotate said lock screw.

2. The security lock of claim 1, wherein said guideway is cylindrical and said lock screw head is circular and sized to fit within said guideway with minimal clearance for added security.

3. The security lock of claim 1, further including a housing insert operable to engage a free end of said lock screw shank to help retain said lock screw in said housing.

4. The security lock of claim 1, further including a lock liner on said housing that extends along an inside surface of said clamp band for a selected distance.

5. The security lock of claim 4, wherein said lock liner begins at or near said clamp base and extends toward said clamp band free end.

6. The security lock of claim 4, wherein a portion of said lock liner defines a channel that slidably captures said clamp band.

7. The security lock of claim 4, wherein said lock liner is arranged so that when said lock is installed on the structure to be locked, said lock liner will be disposed between said clamp band and said structure.

8. The security lock of claim 4, wherein said lock liner comprises graduated markings and associated sizing numerals to assist in trimming said lock liner when said security lock is mounted on a small structure.

9. The security lock of claim 1, wherein said housing includes an elongated rigid arm extending from said barrel portion, said rigid arm having a rigid arm base end attached to said barrel portion at a location that is proximate to said guideway and spaced from said generally U-shaped channel portion in a first direction that parallels a principal axis of said barrel portion, a rigid arm free end that is spaced from said clamp base generally across from an opening defined by said clamp band, and a rigid arm intermediate portion that follows along a length of said clamp band from said rigid arm base end to said rigid arm free end in order to protect said length of said clamp band from unauthorized tampering.

10. The security lock of claim 9, wherein said rigid arm has a channel that receives said clamp band and helps stabilize it.

11. A security lock for clamping a structure, comprising:
a lock housing;
said housing having a barrel portion that is formed with a channel;
said channel being open to one side and one end of said barrel portion and mounting an adjustable band-type clamp;
said clamp being adjustable using a lock screw that is rotatable in a bore of said housing that intersects said channel, said lock screw extending through a base of said clamp that is disposed in said channel and having threads that continuously adjustably engage a ridged thread pattern on a band of said clamp;
said lock screw having a lock screw head with a security lock pattern comprising a curvilinear formation that requires a matching security key to rotate said lock screw; and
said housing further having an elongated rigid arm integral with and extending from said barrel portion, said rigid arm having a rigid arm base end attached to said barrel portion at a location that is proximate to an entrance to said bore and spaced from said channel in a first direction that parallels a principal axis of said barrel portion, a rigid arm free end that is spaced from said clamp base generally across from an opening defined by said clamp band, and a rigid arm intermediate portion that extends from said rigid arm base end in a second direction that is generally transverse to said first direction and follows along a length of said clamp band to said rigid arm free end in order to protect said length of said clamp band from unauthorized tampering.

12. The security lock of claim 11, wherein an entrance to said housing bore forms a guideway in which said lock screw head is recessed, said lock screw head being sized to fit with minimal clearance in said guideway for added security.

13. The security lock of claim 11, further including a housing insert mounted in an open end portion of said channel and operable to help retain said lock screw in said housing.

14. The security lock of claim 11, further including a lock liner on said housing that extends along an inside surface of said clamp band for a selected distance.

15. The security lock of claim 14, wherein said lock liner includes a base portion mounted in a portion of said housing channel that is adjacent to said clamp base, said lock liner further having a free end portion that extends toward a free end of said clamp band.

16. The security lock of claim 14, wherein a portion of said lock liner defines a channel that slidably captures said clamp band.

17. The security lock of claim 14, wherein said lock liner is arranged so that when said lock is installed on the structure to be locked, said lock liner will be disposed between said clamp band and said structure.

18. The security lock of claim 14, wherein said lock liner comprises graduated markings and associated sizing numerals to assist in trimming said lock liner when said security lock is mounted on a small structure.

19. The security lock of claim 11, wherein said rigid arm has a channel that receives said clamp band and helps stabilize it.

20. A security lock for clamping a structure, comprising:
a lock housing;
said housing having a barrel portion that is formed with a channel;
said channel being open to one side and one end of said barrel portion and mounting an adjustable band-type clamp;
said clamp being adjustable using a lock screw that is rotatable in a bore of said housing that intersects said channel, said lock screw extending through a base of said clamp that is disposed in said channel and having threads that continuously adjustably engage a ridged thread pattern on a band of said clamp;
said lock screw having a lock screw head with a security lock pattern comprising a curvilinear formation that requires a matching security key to rotate said lock screw;
said housing bore having an entrance that forms a guideway in which said lock screw head is recessed, said lock screw head being sized to fit with minimal clearance in said guideway for added security;
said housing further having an elongated rigid arm integral with and extending from said barrel portion, said rigid arm having a rigid arm base end attached to said barrel portion at a location that is proximate an entrance to said bore and spaced from said channel in a first direction that parallels a principal axis of said barrel portion, a rigid arm free end that is spaced from said clamp base generally across from an opening defined by said clamp band, and a rigid arm intermediate portion that extends from said rigid arm base end in a second direction that is generally transverse to said first direction and follows along a length of said clamp band to said rigid arm free end in order to protect said length of said clamp band from unauthorized tampering;
a housing insert mounted in an open end portion of said channel and operable to help retain said lock screw in said housing;
a lock liner on said housing that extends along an inside surface of said clamp band for a selected distance;

said lock liner including a base portion mounted in a portion of said housing channel that is adjacent to said clamp base, said lock liner further having a free end portion that extends toward a free end of said clamp band;

a portion of said lock liner defining a channel that slidably captures said clamp band;

said lock liner being arranged so that when said lock is installed on a structure to be locked, said lock liner will be disposed between said clamp band and said structure; and said lock liner comprising graduated markings and associated sizing numerals to assist in trimming said lock liner when said security lock is mounted on a small structure.

* * * * *